United States Patent
Patman Maguire

(10) Patent No.: US 9,535,903 B2
(45) Date of Patent: Jan. 3, 2017

(54) SCORING UNFIELDED PERSONAL NAMES WITHOUT PRIOR PARSING

(71) Applicant: International Business Machines Corporation, Armonk, NY (US)

(72) Inventor: Frankie E. Patman Maguire, Osprey, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/685,587

(22) Filed: Apr. 13, 2015

(65) Prior Publication Data

US 2016/0299886 A1    Oct. 13, 2016

(51) Int. Cl.
*G06F 17/27*    (2006.01)
*G06F 17/28*    (2006.01)

(52) U.S. Cl.
CPC .......... *G06F 17/28* (2013.01); *G06F 17/2785* (2013.01)

(58) Field of Classification Search
CPC .................... G06F 17/30985; G06F 17/30634; Y10S 707/99933; Y10S 707/99936; Y10S 707/99942
USPC .. 704/1, 9, 10; 707/5, 737, 999.005; 706/21, 706/45; 715/200, 205; 1/1
See application file for complete search history.

(56) References Cited

U.S. PATENT DOCUMENTS

| | | | |
|---|---|---|---|
| 6,223,191 B1 * | 4/2001 | Truelson | G06F 17/211 715/205 |
| 7,333,966 B2 | 2/2008 | Dozier | |
| 8,370,366 B2 | 2/2013 | Adams et al. | |
| 8,855,998 B2 | 10/2014 | Gillam et al. | |
| 2007/0005586 A1 * | 1/2007 | Shaefer, Jr. | G06F 17/2705 |
| 2012/0016660 A1 | 1/2012 | Gillam | |
| 2014/0156263 A1 | 6/2014 | Maguire | |

* cited by examiner

*Primary Examiner* — Charlotte M Baker
(74) *Attorney, Agent, or Firm* — North Shore Patents, P.C.; Lesley A. Leonessa

(57) ABSTRACT

A system for determining a similarity between a name phrase and a comparison name phrase, for each name in the name phrase, scores the name. The scoring is based on the field frequency of the name in a name database, where the field frequency indicates a given name frequency and/or a surname frequency in the database. The system uses the scoring to determine a transition from a given name to a surname in the name phrase. The system determines a primary given name and a primary surname in the name phrase based on the scoring and the transition. The system uses the primary given name and primary surname to determine a similarity between the name phrase and a comparison name phrase, where the comparison name phrase comprises a comparison given name and a comparison surname.

13 Claims, 3 Drawing Sheets

SCORING UNFIELDED PERSONAL NAMES WITHOUT PRIOR PARSING

BACKGROUND

The optimal approach to comparing two names of individuals requires knowledge of how the names being compared are parsed; which elements are given names, which are surnames, and what semantic role is played by each name element. For example, in Spanish names, the leftmost of two surname words is the individual's own family name; "Juan Beltran" is a good match for "Juan Beltran Cabrera," but "Juan Cabrera" is not, and these distinctions should be captured in comparison scores to avoid false positives. This requires either pre-fielded data or a pre-processing step to determine the parse. Pre-processing, however, adds time to run-time comparisons, or requires additional memory or storage space to retain the parsed output for later use. Therefore, it would be helpful to determine similarity between names without the need to parse the names prior to the comparison.

SUMMARY

According to one embodiment of the present invention, in a method for determining a similarity between a name phrase and a comparison name phrase, for each name in the name phrase, the method scores the name. The scoring is based on the field frequency of the name in a name database, where the field frequency indicates a given name frequency and/or a surname frequency in the database. The method uses the scoring to determine a transition from a given name to a surname in the name phrase. The method determines a primary given name and a primary surname in the name phrase based on the scoring and the transition. Using the primary given name and primary surname, the method determines a similarity between the name phrase and a comparison name phrase, where the comparison name phrase comprises a comparison given name and a comparison surname.

In one aspect of embodiments disclosed herein, when the method scores each name where the scoring is based on the field frequency of the name in the name database, the method performs the scoring without parsing the name phrase.

In one aspect of embodiments disclosed herein when the method scores each name where the scoring is based on the field frequency of the name in the name database, the method determines the field frequency according to a country associated with the names in the name database.

In one aspect of embodiments disclosed herein when the method scores each name where the scoring is based on the field frequency of the name in the name database, the method averages the field frequency of each name in the name phrase to determine whether an order of names in the name phrase is correct.

In one aspect of embodiments disclosed herein, when the method uses the scoring to determine the transition from the given name to the surname in the name phrase, the method calculates a transition score for each name in the name phrase for which a preceding name exists. The transition score is calculated using the name and the preceding name, where the preceding name precedes the name in an order of names in the name phrase. The method uses the transition score to determine the primary surname in the name phrase. The transition score indicates a transition from given names in the name phrase to the primary surname in the name phrase.

In one aspect of embodiments disclosed here, when the method calculates the transition score for each name in the name phrase for which the preceding name exists, the method averages the field frequency of the name and the field frequency of the preceding name to determine the transition score.

In one aspect of embodiments disclosed herein, when the method uses the primary given name and primary surname to determine the similarity between the name phrase and the comparison name phrase comprises, the method uses the field frequency to adjust an assessment of similar names, where the field frequency indicates whether similar names are likely given names or surnames.

System and computer program products corresponding to the above-summarized methods are also described and claimed herein.

DETAILED DESCRIPTION

Figure 1:
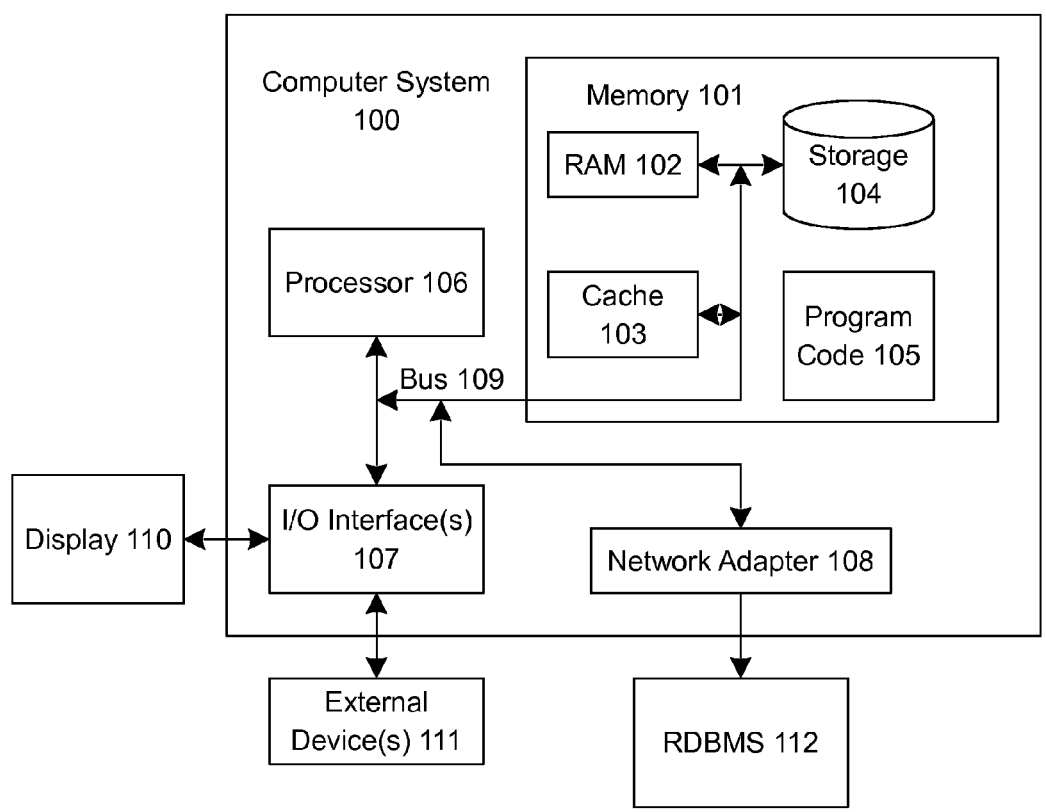
FIG. 1 illustrates an embodiment of a system for determining a similarity between a name phrase and a comparison name phrase, according to embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for determining a similarity between a name phrase and a comparison name phrase according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
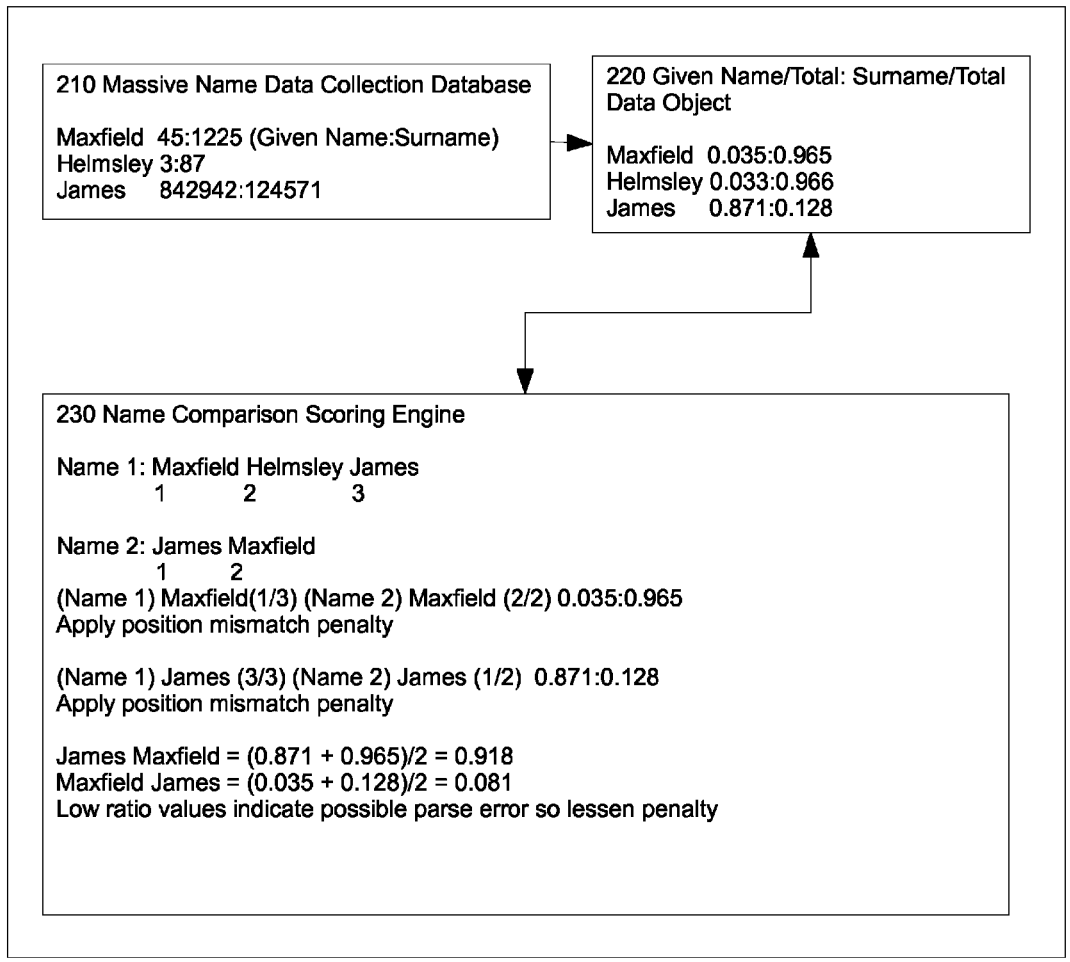
FIG. 2 illustrates an example scoring mechanism, according to embodiments disclosed herein.

FIG. 2 illustrates an example scoring mechanism. A massive name data collection 220 contains name phrases associated with given name fields and surname fields. The occurrence of each name phrase in a given name field is counted, and the occurrence of each name phrase in a surname field is counted. For each name phrase, the ratio of its occurrences in given name fields to its total occurrences is calculated. The ratio of its occurrences in surname fields to its total occurrences is also calculated. This information is available in the data object 220. A name comparison scoring engine 230 compares Name 1 (Maxfield Helmsley James) to Name 2 (James Maxfield). The input names are broken into their component name phrases (i.e., the individual names), and each phrase is labeled for its position in its name phrase.

For example, Name 1: Maxfield (1/3), Helmsley (2/3), James (3/3), and Name 2: James (1/2), Maxfield (2/2). The ratios for each phrase are obtained from the data object 220. For example, Name 1: Maxfield (1/3, 0035:0.965), Helmsley (2/3, 0.033:0.966), James (3/3, 0.871:0.128), and Name 2: James (1/2, 0.871:0.128), Maxfield (2/2, 0.035:0.965). The ratios for the leftmost and rightmost phrase in each name phrase are averaged. A low average may indicate that the phrases in the name phrase were input in the wrong order. For example, the leftmost and rightmost phrase ratio for Name 1 is 0.08 and for Name 2 is 0.918. The low average of Name 1 (Maxfield Helmsley James) may indicate that the name is in the wrong order, for example, the name might actually be James Helmsley Maxfield. Each name in the name phrase from Name 1 is compared with those in Name 2, equivalent phrases, if any, are identified, and assigned a similarity score. For example Maxfield from Name 1 and Maxfield from Name 2 would be considered to be identical, as would James from Name 1 and James from Name 2. For each pair of equivalent phrases, the positional information is compared, and a penalty is applied to the similarity scores for mismatched positions. For example, Maxfield (1/3) from Name 1 and Maxfield (2/2) from Name 2 are equivalent but a penalty is applied to the scoring because Name 1 has Maxfield in the first position of the name phrase, and Name 2 has Maxfield in the second position of the name phrase. Likewise, James (3/3) from Name 1 and James (1/2) from Name 2 are equivalent, but a penalty is applied to the scoring because Name 1 has James in the third position and Name 2 has James in the first position. In an example embodiment, if a name phrase has a low average (such as in the case of Name 1 where the leftmost and rightmost phrase ratio for Name 1 is 0.08), the penalties applied above may be reduced to reflect the possibility that the name phrase may have been inputted incorrectly.

Figure 3:
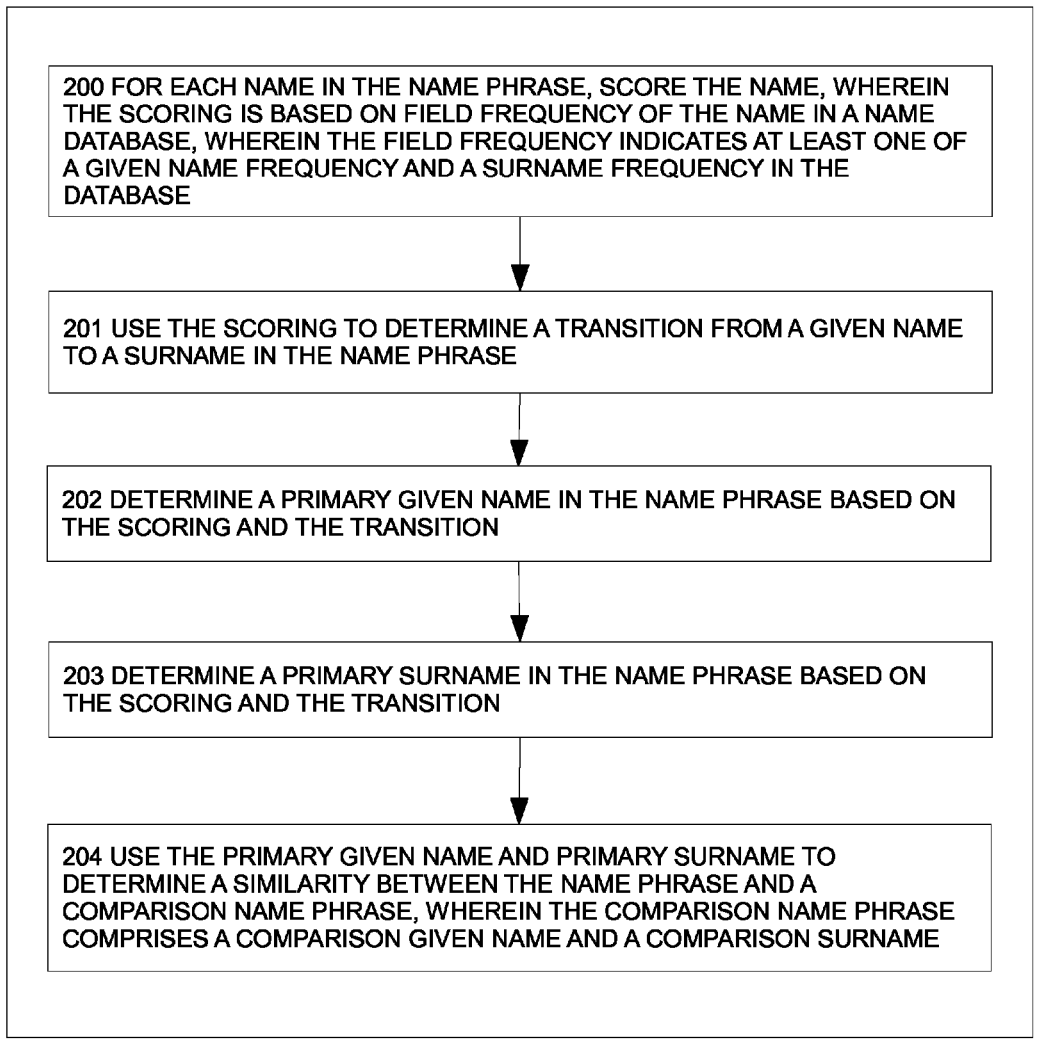
FIG. 3 is a flowchart illustrating an embodiment of a method for determining a similarity between a name phrase and a comparison name phrase, according to embodiments disclosed herein.

FIG. 3 illustrates an embodiment of a method for determining a similarity between a name phrase and a comparison name phrase. At 200, for each name in the name phrase, the method, via the computing processor 106, scores the name. The scoring is based on the field frequency of the name in a massive name data collection database 210. The field frequency indicates at least one of a given name frequency and a surname frequency in the database. In other words, the field frequency indicates how many times a particular name appears in the massive name data collection database 210 as a given name, and how many times the particular name appears in the massive name data collection database 210 as a surname.

At 201, the method uses the scoring to determine a transition from a given name to a surname in the name phrase. In an example embodiment, the scoring allows given names, surnames and semantic roles to be identified during similarity scoring. For example in a name phrase of three names, the scoring provides information indicating whether the second name in the name phrase is the second of two first names, or the first of two surnames. No additional time is required at runtime to create parses, and no parse data need to be stored.

At 202, the method determines a primary given name in the name phrase based on the scoring and the transition. In an example embodiment, the method determines which names in the name phrase are given names, such as "Juan" and "Carlos" in the name Juan Carlos Gomez, and determines "Juan" to be the primary given name. Likewise, the method determines "Juan" to be the primary given name in the name Juan Gomez Beltran.

At 203, the method determines a primary surname in the name phrase based on the scoring and the transition. For example, a name may have multiple given names or multiple surnames, such as Juan Carlos Gomez or Juan Gomez Beltran. Using the name comparison scoring engine 230, the method determines that Gomez is the primary surname in Juan Carlos Gomez, and Gomez is also the primary surname in Juan Gomez Beltran.

At 204, the method uses the primary given name and primary surname to determine a similarity between the name phrase and a comparison name phrase, where the comparison name phrase comprises a comparison given name and a comparison surname. In an example embodiment, when the method uses the name comparison scoring engine 230 to identify primary given names and primary surnames in name phrases, accurate comparisons may be performed between names that might otherwise be categorized as a mismatch. For example, the names "Juan Beltran Cabrera", "Juan Miguel Beltran Cabrera", and "Juan Miguel Beltran" would be considered to be different names if each name in the name phrase were parsed and compared. In each of these name phrases, however, the method categorizes "Juan" as the primary given name and "Beltran" as the primary surname. The method then determines that these three names are good matches.

In an example embodiment, when the method, for each name in the name phrase, scores the name, where the scoring is based on the field frequency of the name in the name database, the method performs the scoring without parsing the name phrase. As mentioned above, parsing adds time to run-time comparisons, or requires additional memory or storage space to retain the parsed output for later use. The method categorizes each name in the name phrase as given names or surnames, and then performs the comparisons.

In an example embodiment, when the method, for each name in the name phrase, scores the name, where the scoring is based on the field frequency of the name in the name database, the method determines the field frequency according to a country associated with the names in the name database. When comparing names, the method may adjust scores based on the origin of the name phrase. For example, in the data object 220, two identical names may be associated with records that originate from different countries, such as the name Udo associated with a German record, and the name Udo associated with a Japanese record. The name Udo, originating from Germany, has a given name/total name ratio of 0.995 while the name Udo, originating from Japan, has a given name/total name ratio of 0.012. These ratio values indicate that the name Udo most likely functions as a given name in Germany while the name Udo most likely functions as a surname in Japan. The difference in given name/total name ratios justifies reducing the similarity score between these two names, even though they are identical.

In an example embodiment, when the method, for each name in the name phrase, scores the name, where the scoring is based on the field frequency of the name in the name database, the method averages the field frequency of each name in the name phrase to determine whether an order of names in the name phrase is correct. As explained in FIG. 2, the given name/total name and surname/total name ratio is calculated for each name in the name phrase. Those ratios are averaged for each name phrase. A low average may indicate that the phrases in the name phrase were input in the wrong order. The given name occurrence ratio and surname occurrence ratio help to determine an optimal similarity scores for a pair of name phrases being compared. For example:

Name 1: Maxfield Helmsley James
Name 2: James Maxfield
From the data object 220 in FIG. 2, the Given Name/Total ratio for each name is:
Maxfield=0.035
Helmsley=0.033
James=0.871
Arranging each name according to name (position, Given Name/Total ratio) yields:
Name 1: Maxfield (1/3, 0.035) Helmsley (2/3, 0.033) James (3/3, 0.871)
Name 2: James (1/2, 0.871) Maxfield (2/2, 0.035)
Comparing each pair of similar names yields:
Maxfield (1/3, 0.035)/Maxfield (2/2, 0.035)
James (1/2, 0.871)/James (3/3, 0.871)
In this example embodiment, comparing Name 1 to Name 2, the ratio of given name to total count has been calculated for each name phrase. The given name figure subtracted from 1 gives the surname to total ratio. The value 0.035 for "Maxfield," for example, indicates that this phrase has a very weak association with the given name field in data sets, but indicates a strong surname association (Surname/Total count=0.965). In contrast, the value 0.871 for "James" indicates that "James" is strongly associated with given name fields, and has a weaker surname association. After determining which phrases are similar using any kind of string similarity assessment mechanism, the positional and ratio values are compared. The phrase "Maxfield" from Name 1 is the leftmost of three phrases (1/3), a given name position, although its given ratio is extremely low (0.035). The matching phrase "Maxfield" from Name 2 is the rightmost of two phrases (2/2), a surname position, and its surname ratio (1.0−0.035=0.965) indicates that it is strongly associated with surname positions in data sets. The phrase "James" from Name 1 is in the surname position (3,3), though its strong given name association (0.871) means it is less common as a surname. "James" from Name 2 is in given name position (1/2) with strong given name association. In Name 1, both the leftmost and rightmost phrases have given name or surname ratio values that are inconsistent with the order of the phrases. The average of their corresponding ratio figures is very low ((0.035+0.129)/2=0.08). This indicates that the input order of the phrases may be incorrect. Therefore, a smaller adjustment to the score for the lack of positional correspondence between the phrases may be applied. In other words, although "Maxfield" is position (1/2) in Name 1 (a given name) and is position (2/2) in Name 2 (a surname), its low given name ratio mitigates the penalty for the positional mismatch, to correct for possible input error.

In an example embodiment, when the method uses the scoring to determine the transition from the given name to the surname in the name phrase, the method calculates a transition score for each name in the name phrase for which a preceding name exists. The transition score is calculated using the name and the preceding name (i.e., the preceding name precedes the name in the order of names in the name phrase). In other words, the ratio of given name frequency to total frequency, and then the differences between those ratios for adjacent phrases, is used to help determine the degree of similarity of a matching surname pair.

The method uses the transition score to determine the primary surname in the name phrase, where the transition score indicates a transition from given names in the name phrase to the primary surname in the name phrase. If a phrase in a full name has a significant given name count, and the subsequent phrase does not, the subsequent phrase may be assumed to be the leftmost surname in the name phrase. For example, for the set of four full names Juan Gomez Beltran, Juan Gomez, Juan Beltran, and Juan Carlos Gomez, the best matches for Juan Gomez Beltran are the names Juan Gomez and Juan Carlos Gomez. This is because, in a Spanish name with two surnames, the leftmost of the two surnames is the name bearer's actual surname, while the rightmost of the two surnames simply indicates the family name of the name bearer's mother. These distinctions can be determined during name scoring by using frequency information, and the transition score. Each phrase in the example names below is labeled as follows: Position/TotalPositions: RatioAverage, GivenNameCountToTotalCountRatio where "Position" is relative position in which the phrase appears, such as first, second, or third. "TotalPositions" is the total number of phrases in the name (i.e., "2/3" means the second phrase of three total phrases). "RatioAverage" is the average of the phrase's given name count ratio (given name frequency/total frequency) and the given name count ratio of the preceding phrase, which is calculated for every phrase which is not in the first position in the name phrase. For example, the "RatioAverage" for the second phrase in a name phrase is the average of the first phrase's given name count ratio (given name frequency/total frequency) and the second phrase's given name count ratio (given name frequency/total frequency) Likewise, the "RatioAverage" for the third phrase in a name phrase is the average of the second phrase's given name count ratio (given name frequency/total frequency) and the third phrase's given name count ratio (given name frequency/total frequency). The "GivenNameCountToTotalCountRatio" is the given name frequency count of a phrase divided by its total frequency count.

1. JUAN GOMEZ BELTRAN
JUAN(1/3,0.981)
GOMEZ(2/3:0.492,0.003)
BELTRAN=(3/3:0.01,0.017)
2. JUAN GOMEZ
JUAN(1/2,0.981)
GOMEZ(2/2:0.492,0.003)
3. JUAN BELTRAN
JUAN(1/2,0.981)
BELTRAN=(2/2:0.499,0.017)
4. JUAN CARLOS GOMEZ
JUAN(1/3,0.981)
CARLOS(2/3:0.982,0.983)
GOMEZ(3/3:0.493,0.003)

In the above examples, the GivenNameCountToTotalCountRatio of phrase 1/3 ("Juan") is 0.981, and the GivenNameCountToTotalCountRatio of phrase 2/3 ("Gomez") is 0.003. The RatioAverage for those phrases is 0.492 (i.e., (0.981+0.003)/2), and this RatioAverage is assigned to phrase 2/3 ("Gomez"). For "Gomez" in the name Juan Gomez Beltran, the representation "GOMEZ (2/3:0.492, 0.003)" means that "Gomez" is the second of three phrases, the average of the "Gomez" given name ratio and that of the preceding phrase "Juan" given name ratio is 0.492, and the "Gomez" given name ratio is 0.003. Since a given name would be expected to have a higher GivenName:Total ratio (i.e., closer to 1, since most of its occurrences in fielded data would be in the given name field), and a surname would be expected to have a lower GivenName:Total ratio (i.e., closer to 0, since few of its occurrences in fielded data would be in the given name field), it is possible to identify a transition from a given name phrase to a surname phrase using this frequency information, and thus to identify the first of multiple surnames. The boundary between the given name part of the full name and the surname part of the full name would be expected to have a RatioAverage close to the middle of the 0-1 range, somewhere around 0.5, since it would be the average of a value close to 1 and a value close to 0. Thus, when a non-initial phrase (meaning the second, third, etc., phrase in the name phrase) has a RatioAverage around 0.5, it can be assumed to be the leftmost surname in the string of phrases that make up the name. When comparing Juan Gomez as a match for Juan Gomez Beltran, in both names, Gomez has an average ratio value of 0.492. This indicates that in both names, Gomez is the transition from given name to surname, and thus is the first surname. In contrast, comparing Juan Beltran to Juan Gomez Beltran, Beltran in Juan Beltran has an average ratio of 0.499, indicating that it is the first surname, while in Juan Gomez Beltran, the average for Beltran is 0.01, indicating that it has a similar GivenName:Total ratio as the preceding phrase, and is thus not the first surname in the name phrase. Therefore, Beltran in Juan Beltran is not a match for the leftmost surname in Juan Gomez Beltran, and this information can be used to adjust the similarity score when comparing the Juan Beltran/Juan Gomez Beltran pair.

The comparison of Juan Carlos Gomez to Juan Gomez also indicates that Gomez is the first surname in both name phrases, since the transitions from Carlos to Gomez (0.493) in Juan Carlos Gomez and from Juan to Gomez (0.492) in Juan Gomez are both in the middle of the 0-1 range. Thus, even though Gomez is the second phrase in Juan Gomez and the third in Juan Carlos Gomez, it still marks the transition point from given name to surname. In Juan Carlos Gomez, the RatioAverage from Juan to Carlos is 0.982, indicating that both of these phrases have a high GivenNameCountToTotalCountRatios and are therefore both given names. This use of frequency information lends itself to culture-specific differentiations as well. For a Spanish name, finding the leftmost surname is the significant transition. For an English name, however, finding the rightmost surname is significant, and the relevant frequency calculations would be determined using that expectation. In this example embodiment, the method averages the field frequency of the name and the field frequency of the preceding name to determine the transition score. In another example embodiment, other kinds of calculations may be used to identify the transition point between a given name and a surname.

In an example embodiment, when the method uses the primary given name and primary surname to determine the similarity between the name phrase and the comparison name phrase, the method uses the field frequency to adjust an assessment of similar names. The field frequency indicates whether similar names are likely given names or surnames, and may be used to help determine the similarity score for a pair of names comprising a single word. For example, a name phrase contains the name "Alan" and a comparison name phrase contains the name "Allen". The names are extremely similar, and are pronounced alike. A string similarity assessment algorithm that takes pronunciation into account would score this pair as highly similar. The difference in spelling, however, may be significant. The spelling of "Alan" is far more common as a given name, while "Allen" is uncommon as a given name compared to how often it is found as a surname. In the data object 220, the given name/total name ratio for Alan is 0.995, and for Allen is 0.17, indicating that Alan ranks high as a given name, and Allen ranks very low as a given name. The difference in the given name/total name ratio for these two names may be considered in determining the similarity of these names, and may be used as justification for lowering a similarity score.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a computing processor; and
   a computer readable storage medium operationally coupled to the processor, the computer readable storage medium having computer readable program code embodied therewith to be executed by the computing processor, the computer readable program code configured to:
   obtain, by a data object, from a name database comprising a plurality of names, a ratio of given name frequency to surname frequency for each of the plurality of names in the name database;
   store in the data object, a ratio of the given name frequency to a total name frequency, and a ratio of the surname frequency to the total name frequency for each of the plurality of names in the name database;
   for each name in the name phrase, score the name using a scoring engine, wherein the scoring is based on field frequency of the name in the name database, wherein the field frequency indicates at least one of the given name frequency and the surname frequency in the database, wherein the scoring engine obtains at least one of the given name frequency and the surname frequency from the data object;
   use, by the scoring engine, the scoring to determine a transition from a given name to a surname in the name phrase, wherein the transition is calculated using at least two of the ratio of the given name frequency to the total name frequency and the ratio of the surname frequency to the total name frequency, wherein the transition is calculated by the scoring engine;
   determine a primary given name in the name phrase based on the scoring and the transition;
   determine a primary surname in the name phrase based on the scoring and the transition; and
   use the primary given name and primary surname to assign a similarity score between the name phrase and a comparison name phrase, wherein the comparison name phrase comprises a comparison given name and a comparison surname.

2. The system of claim 1 wherein the computer readable program code configured to, for each name in the name phrase, score the name using the scoring engine, wherein the scoring is based on the field frequency of the name in the name database is further configured to: perform the scoring without parsing the name phrase.

3. The system of claim 1 wherein the computer readable program code configured to, for each name in the name phrase, score the name using the scoring engine, wherein the scoring is based on the field frequency of the name in the name database is further configured to: determine the field frequency according to a country associated with the names in the name database.

4. The system of claim 1 wherein the computer readable program code configured to, for each name in the name phrase, score the name using the scoring engine, wherein the scoring is based on the field frequency of the name in the name database is further configured to: average the field frequency of each name in the name phrase to determine whether an order of names in the name phrase is correct.

5. The system of claim 1 wherein the computer readable program code configured to use, by the scoring engine, the scoring to determine the transition from the given name to the surname in the name phrase is further configured to:
calculate a transition score for each name in the name phrase for which a preceding name exists, wherein the transition score is calculated using the name and the preceding name, wherein the preceding name precedes the name in an order of names in the name phrase; and
use the transition score to determine the primary surname in the name phrase, wherein the transition score indicates a transition from given names in the name phrase to the primary surname in the name phrase.

6. The system of claim 5 wherein the computer readable program code configured to calculate the transition score for each name in the name phrase for which the preceding name exists is further configured to:
average the field frequency of the name and the field frequency of the preceding name to determine the transition score.

7. A computer program product for determining a similarity between a name phrase and a comparison name phrase, the computer program product comprising:
a computer readable storage medium having computer readable program code embodied therewith, the program code executable by a computing processor to:
obtain, by a data object, from a name database comprising a plurality of names, a ratio of given name frequency to surname frequency for each of the plurality of names in the name database;
store in the data object, a ratio of the given name frequency to a total name frequency, and a ratio of the surname frequency to the total name frequency for each of the plurality of names in the name database;
for each name in the name phrase, score the name using a scoring engine, wherein the scoring is based on field frequency of the name in the name database, wherein the field frequency indicates at least one of the given name frequency and the surname frequency in the database, wherein the scoring engine obtains at least one of the given name frequency and the surname frequency from the data object;
use, by the scoring engine, the scoring to determine a transition from a given name to a surname in the name phrase, wherein the transition is calculated using at least two of the ratio of the given name frequency to the total name frequency and the ratio of the surname frequency to the total name frequency, wherein the transition is calculated by the scoring engine;
determine a primary given name in the name phrase based on the scoring and the transition;
determine a primary surname in the name phrase based on the scoring and the transition; and
use the primary given name and primary surname to assign a similarity score between the name phrase and a comparison name phrase, wherein the comparison name phrase comprises a comparison given name and a comparison surname.

8. The computer program product of claim 7 wherein the computer readable program code configured to use the primary given name and primary surname to determine the similarity between the name phrase and the comparison name phrase is further configured to:
use the field frequency to adjust an assessment of similar names, wherein the field frequency indicates whether similar names are likely given names or surnames.

9. The computer program product of claim 7 wherein the computer readable program code configured to, for each name in the name phrase, score the name using the scoring engine, wherein the scoring is based on the field frequency of the name in the name database is further configured to:
perform the scoring without parsing the name phrase.

10. The computer program product of claim 7 wherein the computer readable program code configured to, for each name in the name phrase, score the name using the scoring engine, wherein the scoring is based on the field frequency of the name in the name database is further configured to:
determine the field frequency according to a country associated with the names in the name database.

11. The computer program product of claim 7 wherein the computer readable program code configured to, for each name in the name phrase, score the name using the scoring engine, wherein the scoring is based on the field frequency of the name in the name database is further configured to:
average the field frequency of each name in the name phrase to determine whether an order of names in the name phrase is correct.

12. The computer program product of claim 7 wherein the computer readable program code configured to use, by the scoring engine, the scoring to determine the transition from the given name to the surname in the name phrase is further configured to:
calculate a transition score for each name in the name phrase for which a preceding name exists, wherein the transition score is calculated using the name and the preceding name, wherein the preceding name precedes the name in an order of names in the name phrase; and
use the transition score to determine the primary surname in the name phrase, wherein the transition score indicates a transition from given names in the name phrase to the primary surname in the name phrase.

13. The computer program product of claim 12 wherein the computer readable program code configured to calculate the transition score for each name in the name phrase for which the preceding name exists is further configured to:
average the field frequency of the name and the field frequency of the preceding name to determine the transition score.

* * * * *